United States Patent Office 3,464,982
Patented Sept. 2, 1969

3,464,982
[2 - (5 - NITRO - 2 - FURYL) - VINYL] - PYRIMIDINE DERIVATIVE AND PROCESS FOR THE PREPARATION THEREOF
Shinsaku Minami, Yamato Kouriyama-shi, Akio Fujita, Ibaragi-shi, Masanao Shimizu, Kobe, and Yoshiyuki Takase, Amagasaki-shi, Japan, assignors to Dainippon Pharmaceutical Co., Ltd., Higashi-ku, Osaka, Japan
No Drawing. Filed Aug. 22, 1966, Ser. No. 573,877
Claims priority, application Japan, Sept. 1, 1965, 40/53,497
Int. Cl. C09b 23/04; A61k 27/00; C07d 51/42
U.S. Cl. 260—240                                 5 Claims

ABSTRACT OF THE DISCLOSURE

Novel 2-(5-nitro-2-furyl)-vinyl pyrimidine derivatives having the formula

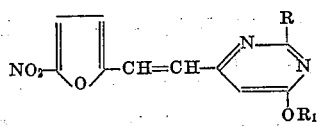

wherein R stands for a member selected from the group consisting of alkylthio, amino, alkylamino, dialkylamino and alkanoylamino, said alkyl and alkanoyl each having 1–4 carbon atoms, and $R_1$ represents a member selected from a hydrogen atom and an alkyl group having 1–4 carbon atoms.

---

It has now been found out that a novel [2-(5-nitro-2-furyl)-vinyl]-pyrimidine derivative of the formula

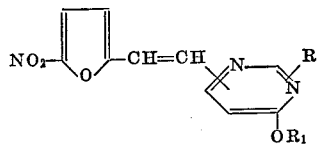   (I)

(wherein R stands for a substituent selected from the group consisting of alkylthio, amino, alkylamino, dialkylamino and alkanoylamino, said alkyl and alkanoyl having 1–4 carbon atoms, and $R_1$ represents a hydrogen atom or an alkyl group having 1–4 carbon atoms) has excellent antibacterial and antiprotozoal activities.

A preferable compound is that which whose 2-(5-nitro-2-furyl)-vinyl group is at 4-position of a pyrimidine nucleus and whose substituent R is at 2-position of the pyrimidine nucleus, above all, whose substituent R is methylthio, amino or acetylamino.

The new compounds of this invention have high activities against important Gram positive and Gram negative strains of pathogenic bacteria such as Staphylococcus aureus, Shigella flexneri and so forth. Further, the compounds have antitrichomonal activities. It can be expected that the compounds are useful in the treatment of bacterial and protozoal infections in man and animals.

The following table summarizes the in vitro activities of the compounds against a variety of microorganisms. The minimum inhibitory concentration (MIC) was determined by well known serial dilution technique.

TABLE

[Antimicrobial activity in vitro (MIC: mcg./ml.)]

| Organism | Compound | | |
|---|---|---|---|
| | N.F. 243 | N.F. 276 | N.F. 450 |
| Staphylococcus aureus | 0.1 | 0.3 | 0.3 |
| Staphylococcus albus | 0.1 | 0.1 | 0.3 |
| Diplococcus pneumoniae I | 30 | 0.3 | 0.3 |
| Diplococcus pneumoniae II | 1 | 0.1 | |
| Diplococcus pneumoniae III | 0.1 | 0.03 | |
| Escherichia coli | 0.3 | 0.1 | 0.3 |
| Klebsiella pneumoniae | 0.3 | 0.1 | 0.3 |
| Salmonella paratyphi A | 1 | 1 | 30 |
| Salmonella enteridis | 1 | 0.3 | 1 |
| Salmonella typhimurium | 0.3 | 0.3 | 3 |
| Shigella flexneri 2a | 1 | 0.3 | 1 |
| Shigella sonnei | 0.3 | 0.3 | 1 |
| Bacillus subtilis | 0.01 | 0.01 | 0.1 |
| Bacillus megaterium | 0.03 | 0.03 | 0.1 |
| Listeria monocytogenes | 0.3 | 1 | 30 |
| Salmonella pullorum | 0.3 | 0.1 | 1 |
| Mycobacterium tuberculosis | 1 | 3 | 10 |
| Trichomonas vaginalis | 0.3 | 10 | 3 |

N.F. 243: 2-methylthio-4-[2-(5-nitro-2-furyl)-vinyl] pyrimidin-6-ol.
N.F. 276: 2-acetamino-4-[2-(5-nitro-2-furyl)-vinyl] pyrimidin-6-ol.
N.F. 450: 2-amino-4-[2-(5-nitro-2-furyl)-vinyl]-pyrimidin-6-ol.

The novel compound of the aforesaid Formula I can be prepared by condensing 5-nitrofurfural or its diacetate with the corresponding substituted methylpyrimidin-6-ol or 6-alkylether by a process known per se.

This condensation reaction can be advantageously carried out by heating a mixture of 5-nitrofurfural (or its diacetate) and the substituted methylpyrimidin-6-ol or -6-alkylether in an organic inert solvent in the presence of a dehydrating agent, for instance at temperatures from 70° C. to 150° C. As the dehydrating agent, a lower fatty acid anhydride such as aceticanhydride as well as phosphoric acid, hydrochloric acid, sulfuric acid or anhydrous zinc chloride are suitable, and with an alkali condensing agent such as piperazine, the yield is not good. As the solvent of this reaction, either said dehydrating agent is used in a large amount concurrently as a solvent or an inert solvent such as glacial acetic acid, an alcohol and dioxane may be utilized.

When the case of 5-nitrofurfural and 2-amino-4-methyl-pyrimidin-6-ol are taken as an example, this condensation reaction is explained as follows.

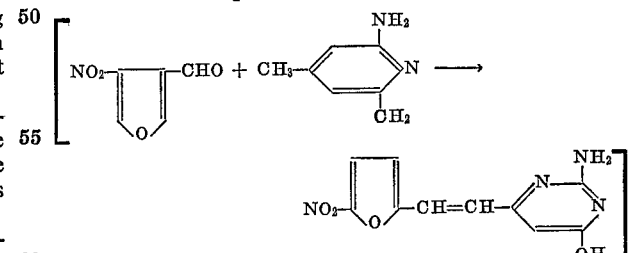

In this reaction as a dehydrating agent a lower fatty acid anhydride such as acetic anhydride is used, at the same time with the condensation the product whose R is an alkanoylamino is obtained by the alkanoylation of the amino group with the fatty acid anhydride.

The compound of this invention whose R is an alkanoylamino group can be converted to the corresponding compound whose R is an amino group by carrying out hydrolysis by a method known per se, for instance, by treating said compound with an acid or an alkali preferably a mineral acid such as hydrochloric acid or sulfuric acid in an inert solvent such as alcohols or dioxanes. On the other hand, the compound of this invention whose R is an amino group can be converted to the corresponding compound whose R is an alkanoylamino group by a method known per se.

Example 1

A mixture of 8.5 grams of 5-nitrofurfural, 10 grams of 2-acetamino-4-methylpyrimidin-6-ol and 20 milliliters of acetic anhydride was heated at 120–125° C. for 7 hours. After cooling, when the separated crystals were filtered and recrystallized from a mixture of dimethylformamide and water, 10.5 grams of 2-acetamino-4-[2-(5-nitro-2-furyl)-vinyl]-pyrimidine-6-ol were obtained. The melting point was 300° C. (decomposition).

0.9 gram of 2-acetamino-4-[2-(5-nitro-2-furyl)vinyl]-pyrimidin-6-ol and 35 milliliters of hydrochloric acid diluted to 20% by ethanol was heated at 100° C. on a water bath for 2 hours. After cooling, the mixture was neutralized by saturated sodium bicarbonate, the crystals were filtered and washed with water, thereafter when the crystals were recrystallized from dimethylformamide, 0.6 gram of 2-amino-4-[2-(5-nitro-2-furyl)-vinyl]-pyrimidin-6-ol was obtained. The melting point was 300° C. (decomposition).

Example 2

2.8 grams of 5-nitrofurfural and 2.5 grams of 2-amino-4-methylpyrimidin-6-ol were dissolved in 20 milliliters of glacial acetic acid containing 2 grams of concentrated sulfuric acid, and the mixture was heated at 80° C. on a water bath for 5 hours. After cooling, the reaction mixture was added with water, neutralized by saturated aqueous sodium bicarbonate, and when the separated crystals were recrystallized from a mixture of dimethylformamide and water, 2 grams of 2-amino-4-[2-(5-nitro-2-furyl)vinyl]pyrimidin-6-ol were obtained. The melting point was 300° C. (decomposition).

Example 3

A mixture of 1.4 grams of 5-nitrofurfural, 1.6 grams of 4-methyl-2-methylthiopyrimidin-6-ol and 3.1 grams of acetic anhydride was heated at 120°–130° C. for 6 hours. After cooling, the separated crystals were washed with water and ether and recrystallized from acetone, and 1 gram of 2-methylthio-4-[2-(5-nitro-2-furyl)-vinyl]-pyrimidin-6-ol was obtained. The melting point was 278° C.

Example 4

1.41 grams of 5-nitrofurfural and 1.70 grams of 4-methoxy-6-methyl-2-methylthiopyrimidine were dissolved in 3.1 milliliters of acetic anhydride, and the mixture was heated at 130° C. on an oil bath for 9.5 hours. After cooling, the separated crystals were washed with ether and recrystallized from acetone, and 0.9 gram of 6-methoxy-2-methylthio-4-[2-(5-nitro-2-furyl)-vinyl]-pyrimidine was obtained. The melting point was 204—206° C.

What is claimed is:

1. A 2-substituted-4-[2-(5-nitro-2-furyl)-vinyl]-pyrimidine derivative of the formula

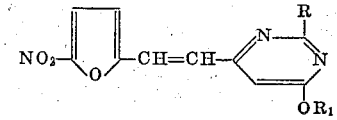

wherein R stands for a member selected from the group consisting of alkylthio, amino, alkylamino, dialkylamino and alkanoylamine, said alkyl and alkanoyl each having 1–4 carbon atoms, and $R_1$ represents a member selected from a hydrogen atom and an alkyl group having 1–4 carbon atoms.

2. 2-amino-4-[2-(5-nitro-2-furyl)-vinyl]-pyrimidin-6-ol.

3. 2-acetamino-4-[2-(5-nitro-2-furyl)vinyl]-pyrimidin-6-ol.

4. 2-methylthio-4-[2-(5-nitro-2-furyl)vinyl]-pyrimidin-6-ol.

5. 6-methoxy-2-methylthio-4-[2-(5-nitro-2-furyl)-vinyl]-pyrimidine.

References Cited
FOREIGN PATENTS

| | | |
|---|---|---|
| 630,163 | 10/1963 | Belgium. |
| 26,408 | 11/1964 | Japan. |
| 14,029 | 7/1965 | Japan. |
| 13,877 | 7/1965 | Japan. |

JOHN D. RANDOLPH, Primary Examiner

U.S. Cl. X.R.

260—999

UNITED STATES PATENT OFFICE
CERTIFICATE OF CORRECTION

Patent No. 3,464,982                      September 2, 1969

Shinsaku Minami et al.

It is certified that error appears in the above identified patent and that said Letters Patent are hereby corrected as shown below:

Column 2, lines 50 to 55, the formula should appear as she below:

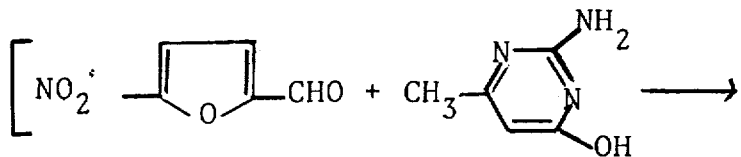

Signed and sealed this 10th day of November 1970.

(SEAL)
Attest:

Edward M. Fletcher, Jr.                  WILLIAM E. SCHUYLER, JR.
Attesting Officer                          Commissioner of Patents